United States Patent [19]

Willemsen

[11] 4,159,878

[45] Jul. 3, 1979

[54] DEVICE FOR FORMING STICKS, BLOCKS AND OTHER FORMED PARTS FROM DOUGH MATERIAL

[76] Inventor: Willem H. Willemsen, 83, Westervalge, Warffum, Netherlands

[21] Appl. No.: 879,911

[22] Filed: Feb. 22, 1978

[30] Foreign Application Priority Data

Feb. 22, 1977 [NL] Netherlands ............ 7701870
Aug. 9, 1977 [NL] Netherlands ............ 7708771

[51] Int. Cl.² ................................................ A21C 1/00
[52] U.S. Cl. ..................................... 366/69; 366/269
[58] Field of Search ............ 366/69, 267, 269, 96–98; 100/41; 425/113, 114, 131.1

[56] References Cited

U.S. PATENT DOCUMENTS

| | | | |
|---|---|---|---|
| 2,211,638 | 8/1940 | Benz | 366/77 |
| 3,459,141 | 8/1969 | Keil | 366/69 X |
| 3,918,862 | 11/1975 | Bellew | 425/114 |

Primary Examiner—Leonard D. Christian
Attorney, Agent, or Firm—Karl W. Flocks

[57] ABSTRACT

A device for forming sticks, blocks or other shaped parts from dough material having a cylinder, and a piston movable upwards and downwards in the cylinder, which cylinder is closed at its underside by a press plate having holes or slots through which dough material may be pressed out of the cylinder, which cylinder is provided with a mixture of powdery material and liquid from above the piston into the cylinder. A stirring installation is provided above the piston with the mixture formed in the space above the piston, while it is in a liquid state, being brought into the space under the cylinder where it stiffens into a dough-like material which is pressed out of the cylinder through the openings in the press plate as the piston in the cylinder is moved downwards.

4 Claims, 3 Drawing Figures

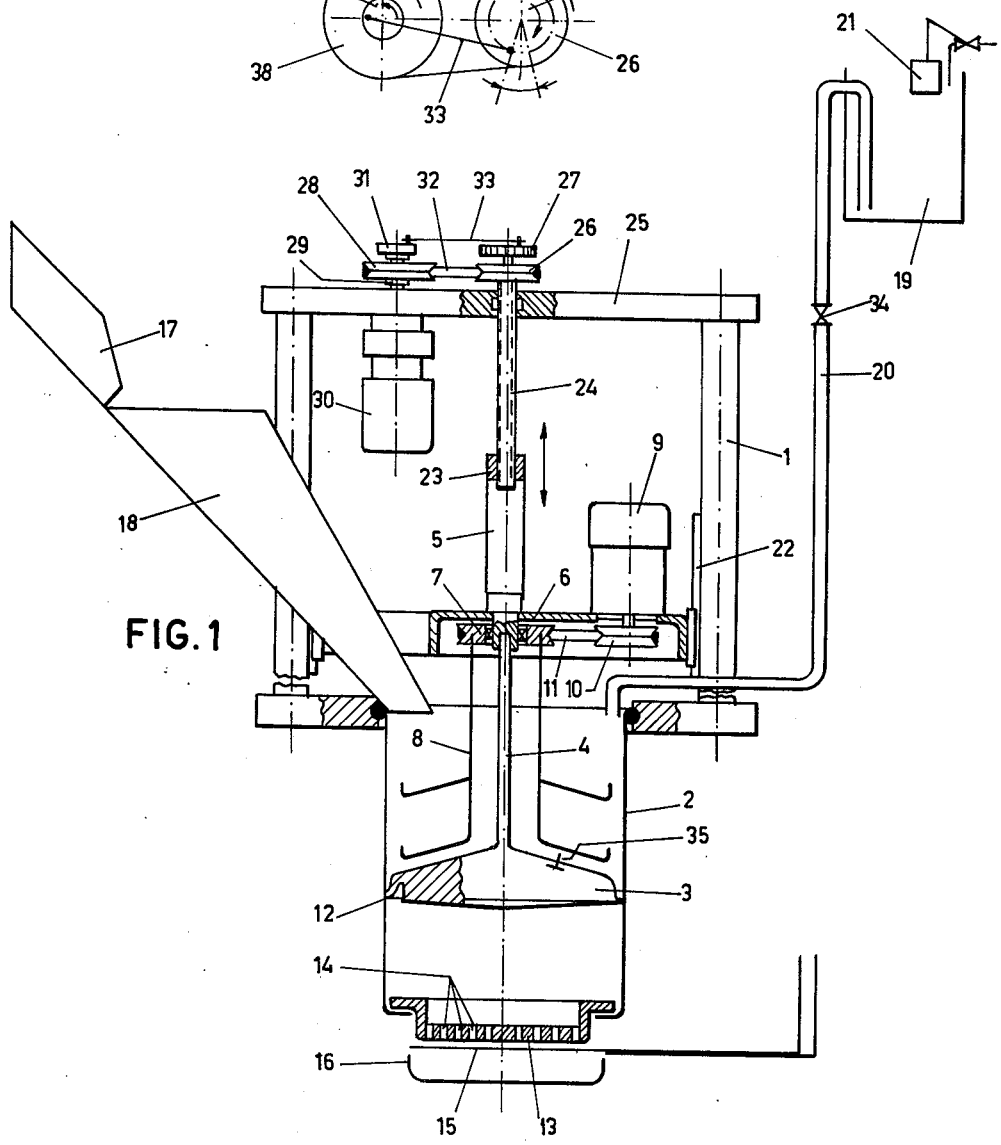

DEVICE FOR FORMING STICKS, BLOCKS AND OTHER FORMED PARTS FROM DOUGH MATERIAL

This invention relates to a device for forming sticks, blocks and other shaped parts from dough material for obtaining so-called French fries, said device having a cylinder with a piston movable upwards and downwards therein and being closed at its underside by a press plate, a cutting means being provided under said plate.

Such a device is generally known. Said known device, however, has the drawback that for filling the cylinder with dough material a separate mixing device is necessary, so that much space is occupied. Another drawback is that for filling the cylinder it is necessary to remove it out of the device, to take it to the mixing device and place it back in the device after its filling. In order to be able to remove the cylinder from the device, the piston must be moved out of the cylinder, whereas the piston must be brought back into the cylinder after the cylinder has been placed into the device. All this takes much time.

Said drawbacks are avoided by the device according to the invention, in that the cylinder is provided with a supply for powdery material and with a liquid supply, whereas above the piston mixing means for mixing the powdery material and the liquid supplied to the cylinder into a liquid mixture, is provided, and that the cylinder and/or the piston are provided with means for bringing the mixture formed in the space above the piston in its liquid state into the cylinder space under this piston, wherein it stiffens into a pressable dough-like material. As the mixing means are provided in the cylinder, the making of dough material requires only a predetermined quantity of powdery material and a predetermined quantity of liquid to be introduced into the cylinder. This can be done manually as well as automatically. As all operations for removing the cylinder out of the device and placing it back into said device are suppressed, a considerable time is saved, so that the cylinder needs not to have large dimensions.

As powdery material for making French fries, croquettes and such like products to be fried in oil or fat, different mixtures of powdery material may be used, which consist mainly of starchy and proteinous powder, thickeners and binders.

The means for bringing the mixture formed in the space above the piston in its liquid state into the cylinder under this piston, may be carried out in different ways. According to a simple and efficient way, the piston may be provided at its periphery with a jacket, which is carried out and mounted in such a way, that in the upwards movement it is movable away from the cylinder wall and in the downwards movement it slides sealingly along the inner wall of the cylinder. The piston itself can also be provided with one or more non-return valves, which is or are mounted in such a way, that in the upwards movement of the piston they let through the liquid mixture of powdery material and liquid and that in the downwards movement that prevent dough material from passing through this valve or these valves. In order to obtain that the mixture above the piston and made in the cylinder can flow fast into the space under the piston, the cylinder wall can be provided with a widened portion, the cylinder wall can be provided with a widened portion, which connects the space above the piston with the space under the piston, when the piston is slightly beyond its highest working position.

An advantageous embodiment of the device according to the invention is characterized in that the cylinder is provided in a frame, in which an upwards and downwards movable platform is provided which supports a driving motor with transmission for driving the mixing means and which is connected on the one hand with the piston-rod and on the other hand with a driving mechanism for the piston.

The free end of the piston-rod may be secured to the platform and the driving mechanism for the piston may consist of a tube mounted to the platform the end of said tube being closed by a closing means with a hole with internal screw thread, in which internal screw thread is mounted a driving rod with external screw thread said driving rod being mounted in the frame in a rotatable way, a driving motor for said rod being provided, of which the shaft is provided with two driving means for driving the piston, which driving means can be coupled independently of each other with this shaft by means of couplings. The device may be carried out in such a way, that the one coupling is carried out for coupling one driving means with the driving rod for the platform for the fast upwards movement and possibly for the fast downwards movement of the piston, and that the other coupling is carried out for coupling a driving means with the platform in such a way, that it moves the piston stepwise over a predetermined distance towards the press plate.

The invention will be explained hereinafter with reference to the drawing, in which by means of example an embodiment of the device according to the invention is shown schematically.

IN THE DRAWING

FIG. 1 shows the device partly in lateral view and partly in section;

FIG. 2 is a top view of the driving mechanism for driving the piston, and

Figure 3:
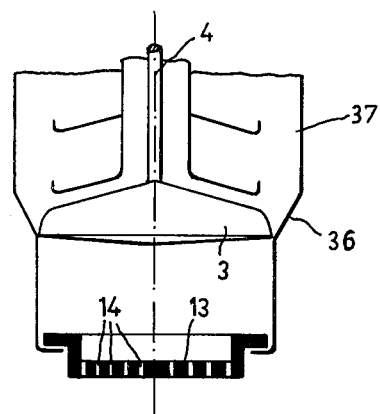
FIG. 3 is a schematical section of the lower part of another embodiment.

The embodiment of the device according to the invention shown in the drawing has a frame 1, in which is provided a cylinder 2, having a piston 3, of which the piston-rod 4 is connected with the lower end of a sleeve 5, which is mounted to a platform 6.

The lower end of the sleeve 5 projects beyond the underside of the platform. On said lower end is mounted a rope pulley 7 in a rotatable way, to which a mixing means 8, carried out as a stirring means, is mounted. An electromotor 9 for driving the stirring installation 8 is mounted on the platform 6 for which purpose the shaft carries a rope pulley 10 and the rope pulleys 7 and 10 are connected with each other by a rope 11. The piston 3 is provided with a jacket 12, which in the upwards movement of the piston can move away from the inner wall of the cylinder 2 and in the downwards movement of the piston is pressed against the inner wall of the cylinder.

The lower end of the cylinder 2 is closed by a press plate 13, which is provided in a way known per se with holes or slots 14, through which dough material present under the piston is pressed out of the cylinder 2 in the shape of sticks, blocks or other shapes. Under the press plate 13 there is a rotating or to and fro movable, driven cutting means 15 for cutting off the sticks, blocks or suchlike parts of dough material, which project from the press plate, as well as a receiving trough 16 for said cutoff parts.

The frame 1 further supports a trough 17, in which a predetermined quantity of powdery material is discharged, which can be supplied from this trough a supply gutter 18 to the cylinder 2. On the frame 1 is mounted further a liquid tank 19, which can supply liquid to the cylinder 2 through a tube 20. In this tank is provided a float 21, which closes the water supply to the tank when a predetermined quantity of liquid is present therein. The platform 6 is guided in fixed guides 22 of the frame 1 in such a way, that it can be moved upwards and downwards without being able to rotate.

For the upwards and downwards movement of the platform 6, the tube 5 is closed at its upper end by a disc 23, which has a hole with internal screw thread. In this internal screw thread grips the external thread of a rod 24, which is rotatable in the upper part 25 of the frame.

On the upper end of the rod 24 are mounted a rope pulley 26 and a ratchet wheel 27. The rope pulley 26 is coupled by a rope with a rope pulley 28, which can be coupled by a coupling 29 with the shaft of an electromotor 30. On the shaft of the electromotor 30 is provided a crank disc 31, which can be coupled with this shaft by a coupling 32. The crank disc 31 is provided with a rod 33, which carries a ratchet tooth (not shown), so that the ratchet wheel 27 is stepwise movable.

The above-described device works as follows:

When the piston 3 is in its lowest position, a not shown slide of the trough 17 is opened, in which trough 17 a predetermined quantity of powdery material is present.

As powdery material for making French fries, croquettes and such-like products to be fried in oil or fat, different mixtures of powdery materials are used, which consist mainly of starchy and proteinous powder, thickeners and binders.

The tap 34 placed in the liquid line 20 is opened so that the liquid in the tank 19 flows into the cylinder 2. After the opening of the slide, also the powdery material flows through the supply gutter 18 into the cylinder 2. By switching on the electromotor 9 the stirring installation 8 intimately mixes the powdery material with the liquid, so that a thin liquid mixture is obtained. After 4 to 5 seconds of intensive stirring the coupling 29 is put in gear, so that the electromotor 30 rotates the rod 24 through the rope pulleys 28 and 26 and the rope thereon. The drive of the rod 24 is chosen in such a way, that the end thereof moves fast in the tube 5, so that the platform 6 and the piston 3 connected thereto are moved upwards fast, preferably in 3 to 5 seconds. Thus, when the holes or slots 14 in the press plate 13 are closed, a vacuum is formed under the piston, so that the thin, liquid mixture formed above this piston is sucked into the space under the piston 3 along the piston jacket 12, which moves away from the inner wall 1 of the cylinder 2. When the device is put into operation, arrangements must of course be made to close the holes or slots 14 before the thin, liquid mixture is let into the space under the piston, whereas these arrangements must be undone after the liquid mixture has stiffened into dough. Hereafter the piston can be moved downwards stepwise by putting into gear the coupling 32 through the crank disc 31, the toothed rod 33, the ratchet wheel 27 with ratchet, the rod 24 and the platform 26, and after each step the sticks or like parts formed under the press plate 13 may be cut off by by means of the cutting means 15.

Preferably the piston 3 is moved downwards only so far, that not only the holes or slots 14 in the press plate 13 are filled with dough material, but that there is still a layer of dough material above the press plate 13, so that a vacuum is formed with certainty under the piston 3 when this piston moves downwards fast after a quantity of thin, liquid mixture has been made again above this piston. When the thin liquid mixture under the piston has arrived on the layer of dough material which is still therein, the pressing out of the dough material need not be delayed but can be started at once. The liquid mixture, which is present above the layer of dough material of the preceding filling, can stiffen during the pressing out of the layer of dough material of the preceding filling.

The device shown in FIG. 3 distinguishes itself from the one according to FIG. 1 in that the cylinder 2 has a conically widening part 36, which merges into a cylindrical part 37. This widening part 36 is provided slightly beyond the active pressing position of the piston above this piston. Thus it is obtained that when the piston is in this position, the space above the piston is connected around this piston with the space under the piston, so that the liquid mixture, which is present above the piston, is sucked into the space under the piston through the entire annular opening between the piston and the widened piston wall. Instead of a conical widening of the cylinder wall, also a spherically widened part or a part that is widened in another way, can be used.

It will be obvious that the invention is not restricted to the embodiment as shown in the drawing and as described in the specification, but that it can be modified in numerous ways without leaving the scope of the invention. Thus it is possible e.g. to replace a jacket 12, which preferably consists of rubber or of an elastic synthetic material, by one or a number of non-return valves 35 in the piston 3, or a pipe which has a valve and which debouches above and under the piston, can be used, which valve can be carried out as a non-return valve or as a manually operated valve. The different parts can be operated manually, but it will be obvious that said parts can also be carried out in such a way, that the entire device functions automatically.

I claim:

1. In an apparatus for producing shaped-dough pieces,
    a frame,
    a movable platform mounted for movement upwards and downwards on said frame,
    a cylinder connected to said frame and having a lower portion forming an extrusion chamber and an upper portion forming a mixing chamber,
    an extrusion piston reciprocably mounted in said cylinder and having a piston rod,
    supply means to supply powdery material and liquid to said mixing chamber,
    stirring means surrounding said piston rod in said mixing chamber and rotatably mounted relative to said frame,
    said piston being at least movable into said mixing chamber to a position where said mixing chamber communicates with said extrusion chamber,
    a press plate over the end of said cylinder opposite from said piston and having extrusion holes therethrough, means to form spacing of the periphery of said piston from the walls of said cylinder during the movement of the piston away from said press plate, said powdery material and said liquid flowing from said mixing chamber to said extrusion chamber due to a suction action and having a resident time in said chambers to form a dough, means to form a suction action upon movement of said piston away from said press plate including residue dough over the extrusion holes in said press plate, and at least one cutting means mounted under said press plate.

2. An apparatus according to claim 1 wherein
said lower portion of said cylinder forming said extrusion chamber is of a size to fit to the periphery of said piston and said upper portion connects to said lower portion and has a larger diameter than said piston.

3. An apparatus according to claim 2 wherein a free end of said piston is secured to said movable platform, a driving mechanism for said piston including a tube mounted to said platform, said tube having an end closed by a closing means having a hole with an internal screw thread, a driving rod with external screw thread is mounted within said internal screw thread, said driving rod being rotatably mounted in said frame, a driving motor for said rod being provided having a shaft provided with two driving means for driving said piston, which driving means can be coupled independently of each other with said shaft by means of couplings.

4. An apparatus according to claim 2 wherein a free end of said piston rod is secured to said movable platform, a driving mechanism for said piston includes a tube mounted to said platform, said tube having an end closed by a closing means having a hole with an internal screw thread, a driving rod with external screw thread is mounted within said internal screw thread, said driving rod being rotatably mounted in said frame, a driving motor for said rod being provided having a shaft provided with two driving means for driving said piston, which driving means can be coupled independently of each other with said shaft by means of couplings, one coupling connected for coupling a driving rod for driving said platform for fast movement of said piston, another coupling connected for coupling a driving means with the platform in such a way, that it moves said piston stepwise over a predetermined distance towards said press plate.

* * * * *